US011098752B2

(12) United States Patent
Smith et al.

(10) Patent No.: US 11,098,752 B2
(45) Date of Patent: Aug. 24, 2021

(54) BALL JOINT WITH A MULTI-PIECE BALL STUD

(71) Applicant: Federal-Mogul Motorparts LLC, Southfield, MI (US)

(72) Inventors: Sean N. Smith, Wentzville, MO (US); Seth Englebright, Festus, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 35 days.

(21) Appl. No.: 16/449,907

(22) Filed: Jun. 24, 2019

(65) Prior Publication Data
US 2020/0400187 A1 Dec. 24, 2020

(51) Int. Cl.
F16C 11/06 (2006.01)

(52) U.S. Cl.
CPC ....... *F16C 11/0628* (2013.01); *F16C 11/0609* (2013.01); *Y10T 403/32704* (2015.01)

(58) Field of Classification Search
CPC .............. B60G 7/005; B60G 2204/416; F16C 11/0609; F16C 11/0628; F16C 11/0633; F16C 11/0638; F16C 11/0685; Y10T 403/32196; Y10T 403/32204; Y10T 403/32311; Y10T 403/32681; Y10T 403/32696; Y10T 403/32704; Y10T 403/32713; Y10T 403/32721; Y10T 403/32729; Y10T 403/32737
USPC ..... 403/76, 77, 90, 128, 130, 131, 132, 133, 403/134, 135
See application file for complete search history.

(56) References Cited

U.S. PATENT DOCUMENTS

| 2,999,709 | A | * | 9/1961 | Melton | F16C 11/0609 403/125 |
| 3,269,758 | A | * | 8/1966 | Ulderup | F16C 11/0609 403/131 |
| 5,000,416 | A | * | 3/1991 | Fantasia | B23Q 1/5462 403/131 |
| 5,040,817 | A | * | 8/1991 | Dunn | F16C 11/0609 280/511 |
| 6,113,303 | A | * | 9/2000 | Buhl | F16C 11/0609 403/122 |
| 8,141,841 | B2 | * | 3/2012 | von Lillienskjold | F16C 11/0609 248/677 |
| 10,820,960 | B2 | * | 11/2020 | Manley | F16C 11/0609 |
| 2008/0019766 | A1 | * | 1/2008 | Flaim | F16C 11/0609 403/122 |

(Continued)

FOREIGN PATENT DOCUMENTS

| DE | 3938475 A1 | * | 5/1991 | ............ B60G 7/005 |
| DE | 102011081935 A1 | * | 3/2013 | .......... F16C 11/0609 |
| EP | 1124086 A1 | * | 8/2001 | .......... F16C 11/0609 |

*Primary Examiner* — Josh Skroupa
(74) *Attorney, Agent, or Firm* — Robert L Stearns; Dickinson Wright, PLLC

(57) ABSTRACT

The ball joint includes a housing that has an inner bore. A ball stud is partially received in the inner bore. The ball stud has a ball portion and a shank portion which are separate pieces from one another and which are in threaded engagement with one another. At least one bearing is disposed in the inner bore and slidably supports the ball portion of the ball stud for allowing the ball stud to rotate and articulate relative to the housing. The ball portion is shaped through a forging operation, and the shank portion is shaped through a process which includes machining and does not include forging.

13 Claims, 4 Drawing Sheets

(56) References Cited

U.S. PATENT DOCUMENTS

2008/0145141 A1\* 6/2008 Broeker ............. F16C 11/0609
403/39
2018/0320734 A1\* 11/2018 Rousseau ............ F16C 11/0685

\* cited by examiner

BALL JOINT WITH A MULTI-PIECE BALL STUD

BACKGROUND OF THE INVENTION

1. Field of the Invention

The present invention is related generally to ball joints, such as of the type for use in automotive suspension systems.

2. Related Art

Automobile suspension systems typically include a plurality of ball joints which interconnect certain components with one another while allowing those components to rotate and articulate relative to one another. Such ball joints typically include a housing, a ball stud, and one or more bearings. In many such ball joints, the ball stud is made as a single monolithic piece which is shaped through a forming operation which includes both forging and machining.

SUMMARY OF THE INVENTION

One aspect of the present invention is related to a ball joint which includes a housing that has an inner bore. A ball stud is partially received in the inner bore. The ball stud has a ball portion and a shank portion which are separate pieces from one another and which are in threaded engagement with one another. At least one bearing is disposed in the inner bore and slidably supports the ball portion of the ball stud for allowing the ball stud to rotate and articulate relative to the housing. The ball portion is shaped through a forging operation, and the shank portion is shaped through a process which includes machining and does not include forging.

According to another aspect of the present invention, the ball portion includes an opening with female threads, and the shank portion includes a post with male threads.

Another aspect of the present invention is related to a set of ball joints which includes a first ball joint and a second ball joint. Each of the first and second ball joints has a housing, at least one bearing, and a ball stud. Each ball stud has a ball portion and a shank portion which are in threaded engagement with one another. The ball portions of the first and second ball joints are identical to one another, and the shank portions of the first and second ball joints are not identical with one another.

According to another aspect of the present invention, for each of the first and second ball stud, the ball portion has an opening with female threads and the shank portion has a post with male threads.

According to yet another aspect of the present invention, the first and second ball joints have not identical housings.

According to still another aspect of the present invention, the first and second ball joints have not identical bearings.

According to a further aspect of the present invention, the ball portions of the first and second ball joints are shaped through forging operations.

According to yet a further aspect of the present invention, the shank portions of the first and second ball joints are shaped through respective processes which include machining and does not include forging.

Yet another aspect of the present invention is related to a method of making a set of ball joints. The method includes the step of threadedly connecting a first ball portion with a first shank portion to form a first ball stud. The method continues with the step of inserting a first bearing into a first inner bore of a first housing. The method proceeds with the steps of inserting the first ball portion of the first ball stud into the first inner bore of the first housing and establishing slidable contact with the first ball portion and the first bearing so that the first ball stud can rotate and articulate relative to the first housing. The method continues with the step of threadedly connecting a second ball portion with a second shank portion to form a second ball joint. The method proceeds with the step of inserting a second bearing into a second inner bore of a second housing. The method continues with the step of inserting the second ball portion of the second ball stud into the second housing and establishing slidable contact between the second ball portion and the second bearing so that the second ball stud can rotate and articulate relative to the second housing. The first and second ball portions of the first and second ball studs respectively are identical with one another, and the first and second shank portions of the first and second ball studs respectively are not identical with one another.

According to another aspect of the present invention, the first and second housings are not identical with one another.

According to yet another aspect of the present invention, the first and second bearings are not identical with one another.

According to still another aspect of the present invention, the method further includes the step of shaping the first and second ball portions through forging operations.

According to a further aspect of the present invention, the method further includes the step of shaping the first and second shank portions through an operation which includes machining and does not include forging.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
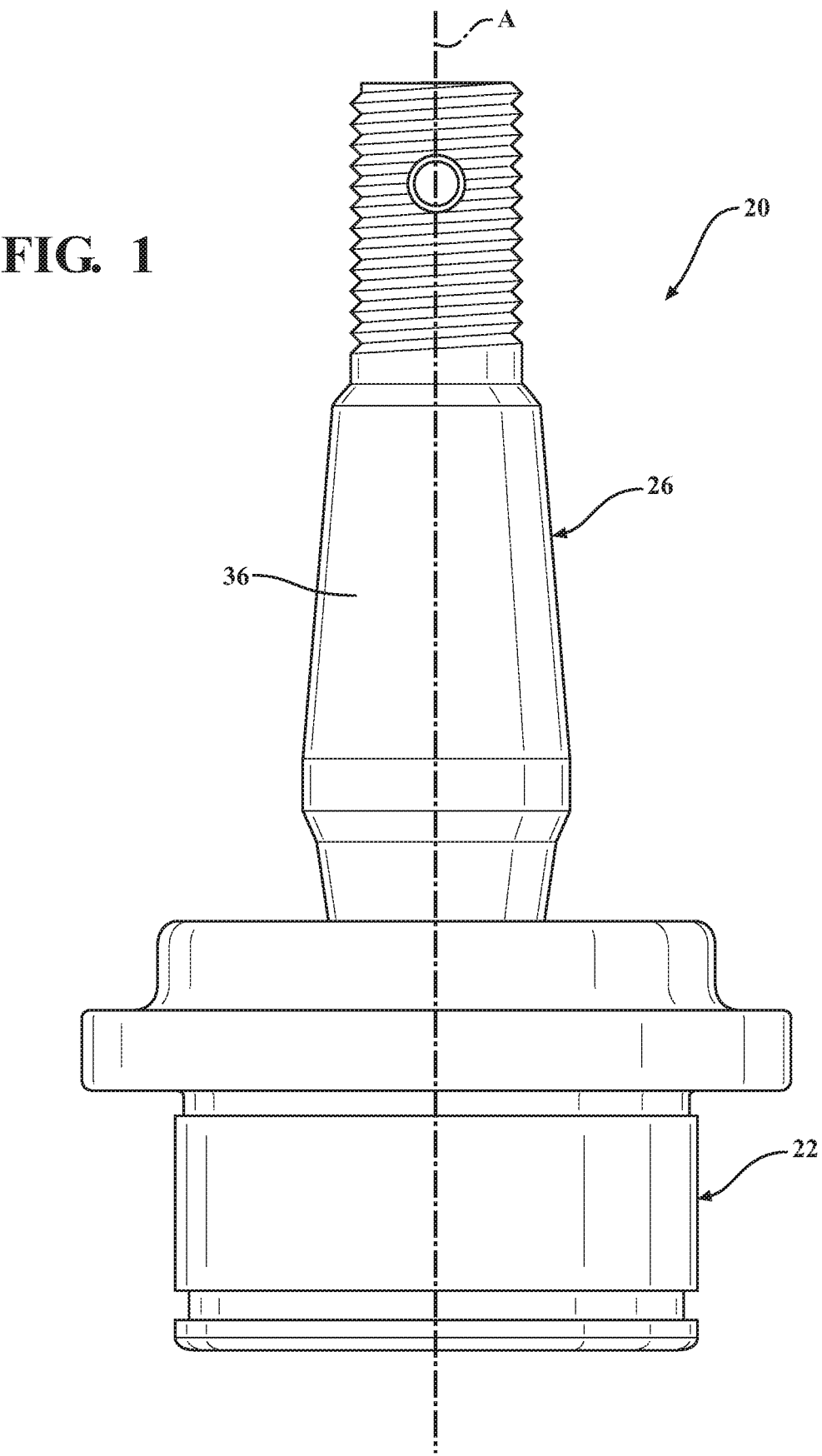
FIG. 1 is a front elevation view of a first exemplary embodiment of a ball joint constructed according to one aspect of the present invention.
Figure 2:
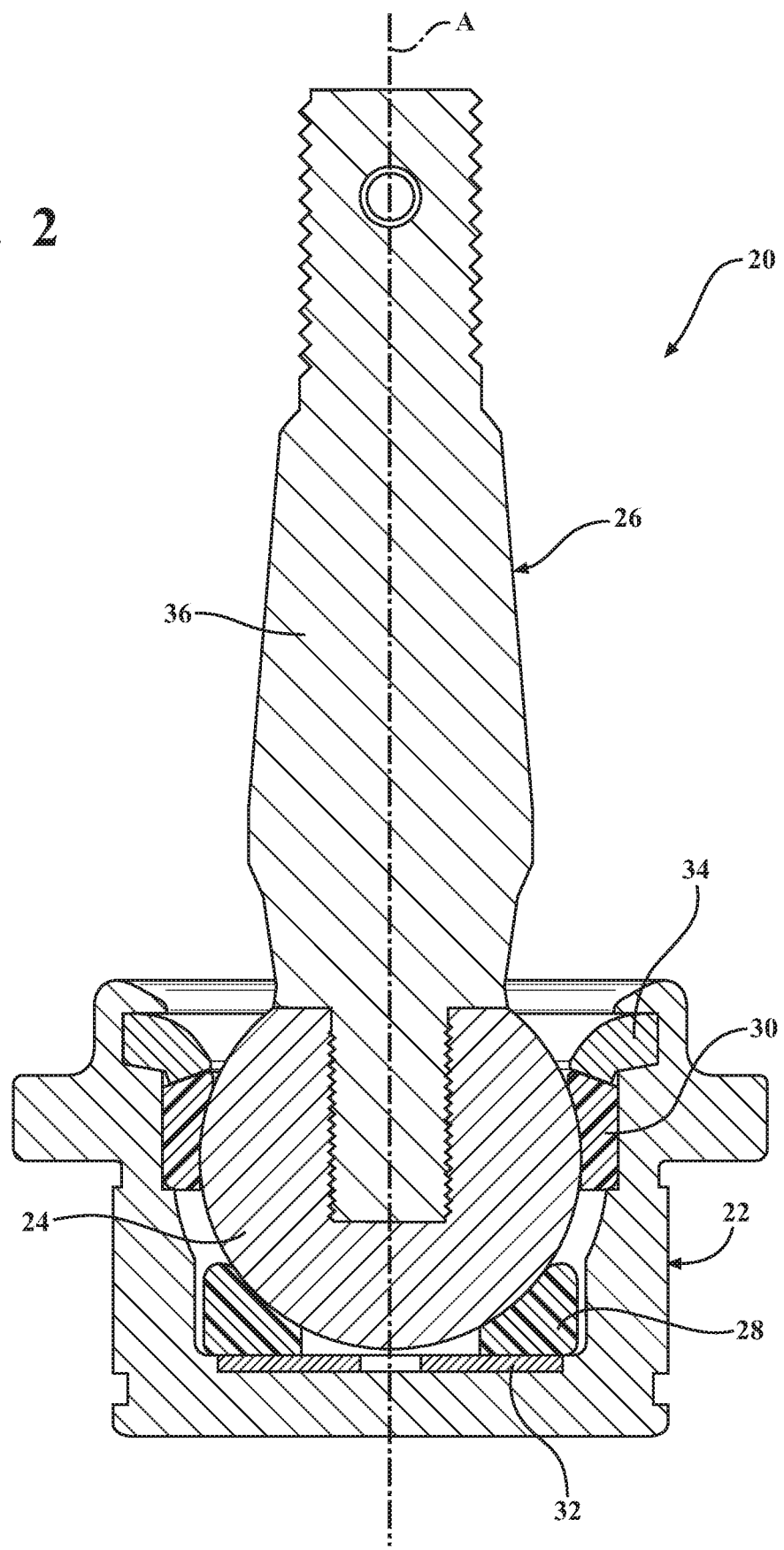
FIG. 2 is a cross-sectional view of the ball joint of FIG. 1.
Figure 3:
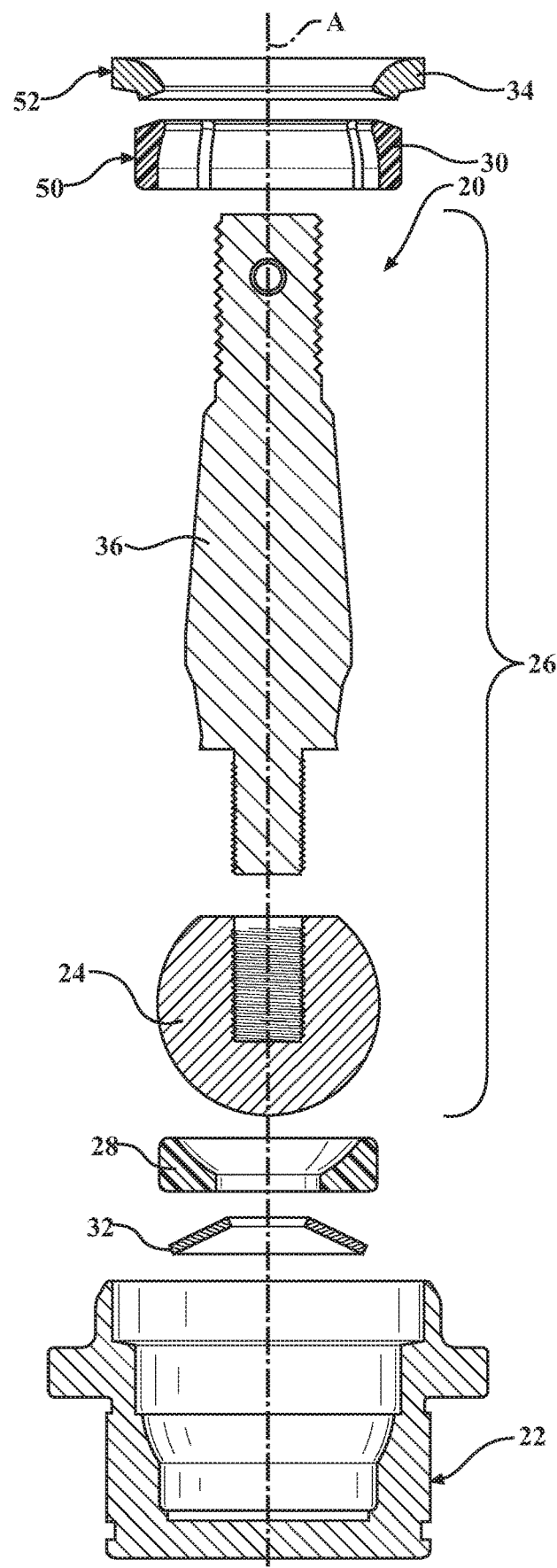
FIG. 3 is an exploded and cross-sectional view of the ball joint of FIG. 1.
Figure 4:
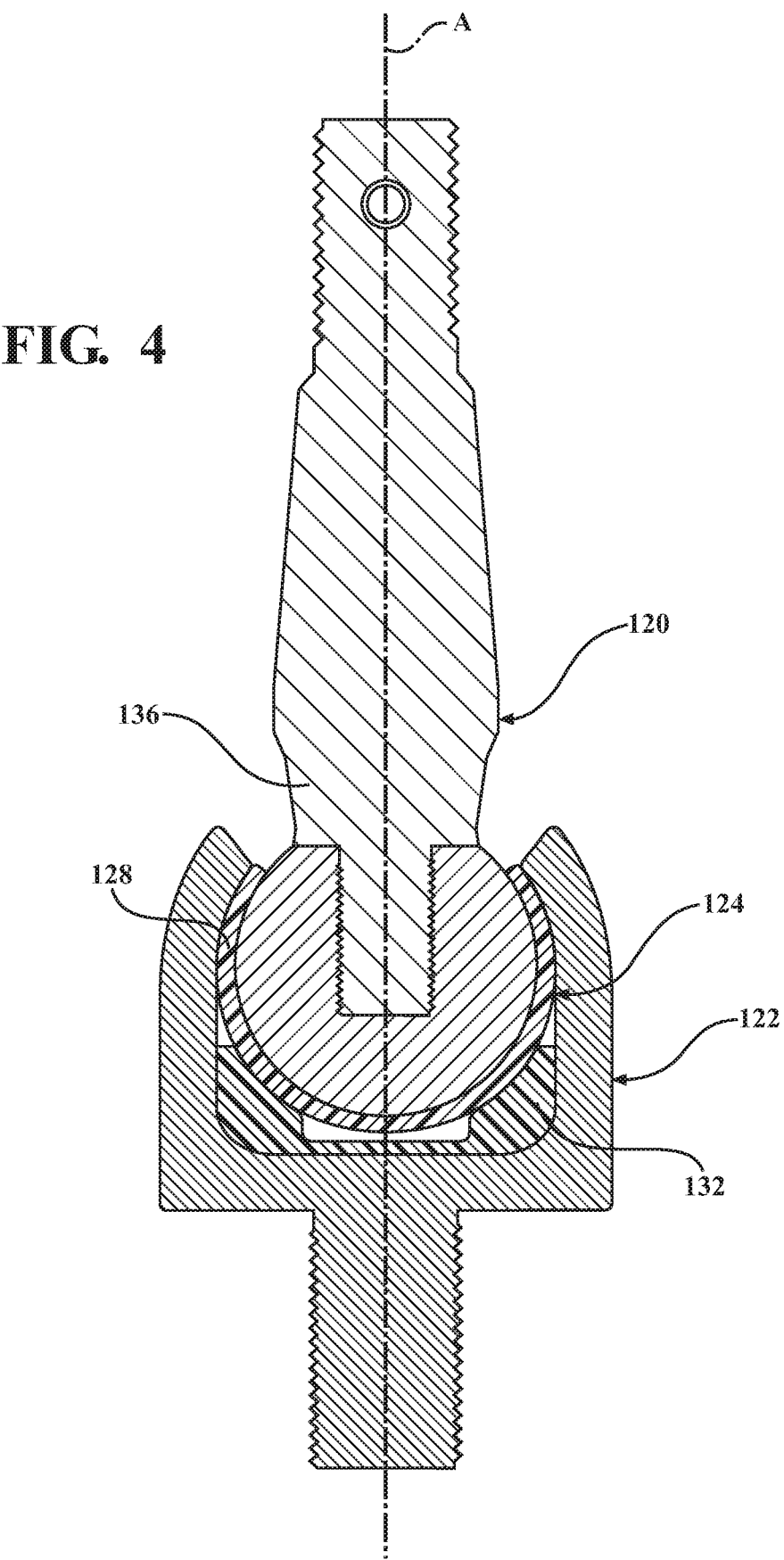
FIG. 4 is a cross-sectional view of a second exemplary embodiment of the ball joint.

Referring to the Figures, wherein like numerals indicate corresponding parts throughout the several views, a first exemplary embodiment of a ball joint 20 constructed according to one aspect of the present invention is generally shown in FIGS. 1-3, and a second embodiment of the ball joint 120 is generally shown in FIG. 4. The ball joint 20 is constructed to operably connect a pair of components with one another while allowing those components to both rotate and articulate relative to one another. For example, in the first exemplary embodiment, the ball joint 20 is specifically adapted for use in a suspension or steering system of an automotive vehicle, such as to connect a control arm (not shown) with a knuckle (not shown) or to connect a tie rod end (not shown) with the knuckle. However, it should be appreciated that the ball joint 20 could find uses in a range of both automotive or non-automotive applications to connect a range of different types of components with each other. As discussed in further detail below, the present invention allows for cost savings through economies of scale by making a ball stud 26 of the ball joint 20 out of multiple pieces with one piece being identical, or common, across a number of differently configured ball joints 20, 120 and another piece being different across different ball joints 20, 120.

As shown in FIGS. 1 and 2, the ball joint 20 of the first exemplary embodiment includes a housing 22 that has a cartridge-style construction in that it is shaped to be press-fit into an opening of the control arm. The housing 22 has a radially outwardly extending flange, which defines a stopping point for the press-fitting operation, and a groove for receiving a clip to lock the housing 22 with the control arm after the housing 22 has been pressed into the opening. Alternatively to the cartridge-style construction of the first exemplary embodiment, the housing 22 could be monolithic with another component, such as a tie rod end. The housing 22 is preferably made of metal, such as steel, an alloy steel, aluminum, an aluminum alloy, etc. The housing 22 may be made through any suitable process or combination of processes including, for example, casting, forging, machining from a billet, etc.

With reference to FIG. 2, the housing 22 of the first exemplary embodiment presents an inner bore which extends along a central axis A from a lower wall at a closed first end to an open second end (alternatively, the inner bore could extend between two open ends). A ball portion 24 of a ball stud 26 is received in the inner bore and is supported by a pair of bearings 28, 30 (specifically, a backing bearing 28 and an exit bearing 30) which provide a low-friction interface between the ball stud 26 and the housing 22 to allow these components to articulate and rotate relative to one another during operation of the vehicle. Specifically, the ball portion 24 of the ball stud 26 has a semi-spherically curved outer surface, and the bearings 28, 30 have respective curved bearing surfaces that have a similar radius of curvature to the outer surface of the ball portion 24. The bearing surfaces are in direct, slidable contact with the ball portion 24 of the ball stud. In the first exemplary embodiment, the backing bearing 28 slidably supports a lower hemisphere of the ball portion 24, and the exit bearing 30 supports both an upper hemisphere and an equator of the ball portion 24. The bearings 28, 30 are preferably made of either plastic (such as, for example, a carbon-fiber reinforced Acetal material) or metal and may be shaped through any suitable process or processes, such as injection molding or die casting.

In the first exemplary embodiment, a preload member 32 in the form of a Belleville washer is disposed in the inner bore of the housing 22 between the backing bearing 28 and the lower wall of the housing 22. The preload member 32 is compressed elastically to apply a spring force against the backing bearing 28 and thereby bias the curved bearing surface of the backing bearing 28 against the outer surface of the ball portion 24. Biasing the bearing surface against the ball portion 24 has the effect of establishing a preload force which increases the magnitude of force that is necessary to overcome static friction between the ball portion 24 and the bearings 28, 30 and allow the ball stud 26 and housing 22 to rotate relative to one another. In alternate embodiments, the preload member 32 may take a range of different forms. For example, in some embodiments, the preload member 32 take the form of an elastomeric cushion or a coil spring.

The ball joint 20 further includes a cover plate 34 that is disposed in the inner bore of the housing 22 adjacent the open second end and that is in direct contact with both the housing 22 and with the exit bearing 30 for retaining the exit bearing 30, the ball portion 24, the backing bearing 28, and the Belleville washer within the inner bore. In the first exemplary embodiment, the cover plate 34 is locked with the housing 22 via a swaging operation. However, it should be appreciated that the cover plate 34 could be locked with the housing 22 via any suitable means including, for example, threading, welding, adhesives, etc.

The ball stud 26 also includes a shank portion 36 which is fixedly attached with the ball portion 24 and which projects out of the inner bore of the housing 22 through the open end for attachment with the knuckle. The shank portion 36 extends along the central axis A from where it mates with the ball portion 24 to a threaded distal end for receiving a nut to secure the shank portion 36 with the knuckle. Along its full axial length from the ball portion 24 to the distal end, the shank portion 36 has a lesser diameter than a diameter of the ball portion 24. The shank portion 36 could have a range of different shapes and configurations for use with different applications.

The ball portion 24 and shank portion 36 are preferably both made of metal, such as steel, an alloy steel, an aluminum, an aluminum alloy, etc. The ball portion 24 and the shank portion 36 may be made of the same material or different materials. In the first exemplary embodiment, the ball portion 24 is shaped to nearly its final form through a forging operation and then finished via a machining operation, and the shank portion 36 is shaped to its final form by a process which includes machining and does not include forging. More preferably, the shank portion 36 is made by machining a billet. Alternatively, the process of making the shank portion 36 could include both forging and machining.

In the first exemplary embodiment, the shank portion 36 and the ball portion 24 threadedly connected with one another. More specifically, the ball portion 24 has an opening which extends less than fully through the ball portion 24 and which is tapped to present female threads. One axial end of the shank portion 36 presents a post which is tapped to present male threads. During assembly of the ball joint 20, the post of the shank portion 36 is inserted into the opening of the ball portion 24 and is threaded therein to lockingly connect the ball and shank portions 24, 36 together. An adhesive may be employed to prevent unintentional detachment of the two components of the ball stud 26.

Referring now to FIG. 4, a second exemplary embodiment of the ball joint 120 is generally shown with like numerals, separated by a prefix of "1", indicating corresponding parts with the first exemplary embodiment described above. In the second embodiment, the ball joint 120 is configured as an inner tie rod end in that the housing 122 presents a threaded post for attachment with a center link. This embodiment is also distinguished from the first embodiment in that only a single bearing 128 is included, and that bearing 128 has the form of a snap over bearing in that it is in slidable contact with all of the upper hemisphere, the lower hemisphere, and the equator of the ball portion 124. The preload member 132 of this embodiment is in the form of an elastomeric cushion which is compressed elastically to impart the biasing force against the bearing, thereby preloading the bearing against the ball portion 124.

The ball portions 24, 124 of the first and second embodiments are, within reasonable tolerances, identical in shape, material, dimensions, and construction. While the shank portions 36, 136 of the respective ball studs 26, 126 have different shapes, both shank portions 36, 136 are in threaded engagement with their respective ball portions 24, 124.

Thus, the same ball portion 24, 124 can be made mass produced and used in combination with different shank portions 36, 136 for different applications by simply threading the appropriate shank portion 36, 136 for the respective application onto one of the ball portions 24, 124. This allows for cost savings through economies of scale, particularly in the case where certain shank portions 36, 136 are only made in relatively low volume since only the shank portion 36, 136, not the full ball stud 26, 126, has to be made at that relatively low volume.

Another aspect of the present invention is related to a set of ball joints 20, 120, such as the first exemplary embodiment shown in FIGS. 1-3 and the second exemplary embodiment shown in FIG. 4. The ball joints 20, 120 in the set have ball studs 26, 126 with differently shaped shank portions 36, 136 but with identical ball portions 24, 124. The ball joints 20, 120 may also have, inter alia, differently configured housings 22, 122, preload members 32, 132, bearings 28, 30, 128, and cover plates 34, 134.

Yet another aspect of the present invention is related to a method of making a set of ball joints 20, 120, such as the ball joints 20, 120 of the first and second embodiments. The method includes the step of threading not identical shank portions 36, 136 for different ball joints 20, 120 into identical ball portions 24, 124.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A ball joint, comprising:
a housing having an inner bore;
a ball stud partially received in said inner bore;
said ball stud including a ball portion and a shank portion which are separate pieces from one another and which are in threaded engagement with one another;
at least one bearing disposed in said inner bore and slidably supporting said ball portion of said ball stud for allowing said ball stud to rotate and articulate relative to said housing;
said ball portion being shaped through a forging operation; and
said shank portion being shaped through a process which includes machining and does not include forging.

2. The ball joint as set forth in claim 1 wherein said ball portion includes an opening with female threads and wherein said shank portion includes a post with male threads.

3. A set of ball joints, comprising;
a first ball joint and a second ball joint;
each of said first and second ball joints having a housing, at least one bearing, and a ball stud with a ball portion and a shank portion which are in threaded engagement with one another;
said ball portions of said first and second ball joints being identical with one another; and
said shank portions of said first and second ball joints being not identical with one another.

4. The set of ball joints as set forth in claim 1 wherein, for each of said first and second ball studs, said ball portion has an opening with female threads and said shank portion has a post with male threads.

5. The set of ball joints as set forth in claim 1 wherein said first and second ball joints have not identical housings.

6. The set of ball joints as set forth in claim 5 wherein said first and second ball joints have not identical bearings.

7. The set of ball joints as set forth in claim 3 wherein said ball portions of said first and second ball joints are shaped through forging operations.

8. The set of ball joints as set forth in claim 7 wherein said shank portions of said first and second ball joints are shaped through respective processes which include machining and do not include forging.

9. A method of making a set of ball joints, comprising the steps of:
threadedly connecting a first ball portion with a first shank portion to form a first ball stud;
inserting a first bearing into a first inner bore of a first housing;
inserting the first ball portion of the first ball stud into the first inner bore of the first housing and establishing slidable contact between the first ball portion and the first bearing so that the first ball stud can rotate and articulate relative to the first housing;
threadedly connecting a second ball portion with a second shank portion to form a second ball stud;
inserting a second bearing into a second inner bore of a second housing;
inserting the second ball portion of the second ball stud into the second inner bore of the second housing and establishing slidable contact between the second ball portion and the second bearing so that the second ball stud can rotate and articulate relative to the second housing; and
wherein the first and second ball portions of the first and second ball studs are identical with one another and wherein the first and second shank portions of the first and second ball studs are not identical with one another.

10. The method as set forth in claim 9 wherein the first and second housings are not identical with one another.

11. The method as set forth in claim 10 wherein the first and second bearings are not identical with one another.

12. The method as set forth in claim 9 further including the step of shaping the first and second ball portions through a forging operation.

13. The method as set forth in claim 12 further including the step of shaping the first and second shank portions through an operation which includes machining and does not include forging.

* * * * *